United States Patent Office 3,506,456
Patented Apr. 14, 1970

3,506,456
COTTAGE CHEESE CREAMING MIXTURE
Burton J. Flick, St. Paul, Minn., and Joseph P. Pisani, Mount Prospect, Ill., assignors to Kraftco Corporation, a corporation of Delaware
No Drawing. Continuation-in-part of application Ser. No. 429,158, Jan. 29, 1965. This application May 24, 1968, Ser. No. 731,724
Int. Cl. A23c 19/00
U.S. Cl. 99—115    11 Claims

ABSTRACT OF THE DISCLOSURE

An improved cottage cheese creaming mixture is prepared by blending comminuted cottage cheese curd with a cottage cheese creaming mixture.

---

The following is a continuation-in-part of application Ser. No. 429,158, filed Jan. 29, 1965 and now abandoned.

The present invention generally relates to cottage cheese, and more particularly it relates to the manufacture of creamed cottage cheese.

Cottage cheese is a well-known and commercially important variety of cheese. It is an uncured cheese which is made from skim milk, but may also be made from reconstituted concentrated skim milk or nonfat milk solids. The term "skim milk" as used herein refers to milk from which the milk fat has been substantially separated. Cottage cheese curd usually comprises 78 to 80 percent moisture and less than about 0.3 percent fat by weight. Cottage cheese is generally sold in two forms. The first form, which presently represents a relatively small proportion of the total consumption of cottage cheese, comprises the washed, drained and salted or unsalted curd obtained by conventional cottage cheese make procedures. The second form, which presently represents the largest proportion of the total consumption of cottage cheese, comprises the same curd to which has been added a creaming mixture. It is in connection with the second form, or creamed cottage cheese, that the present invention is particularly applicable.

A typical commercial cottage cheese make procedure is as follows:

Inoculation—Pasteurized skim milk is mixed with a suitable bacterial starter, such as a *Streptococcus lactis*. Starter culture and rennet are usually added in order to facilitate coalescing of the protein of the skim milk to provide a coagulum.

Setting—The milk is allowed to develop acidity so that the protein of the milk coalesces or sets to provide a coagulum. In this period, acid is developed in the milk because of the action of the starter. The setting period is normally more than about four hours and setting is usually effected at a temperature of from 85° F. to 92° F. Longer setting periods have been employed, for example 12 to 16 hours, at a temperature of 70° F. to 80° F. with smaller amounts of a lactic starter culture. The activity of the starter also affects the setting time.

Cutting—After the curd is set, that is, after a coagulum is formed, the coagulum is cut into small pieces to provide curd particles. Curd particles are usually of cube shape. Conventionally, the coagulum is cut to provide curd when the titratable acidity of the whey by a 0.10 N basic solution is approximately 0.50 percent or above. Acidity is usually expressed as equivalent lactic acid. When the milk is given high heat treatment or varies in character, other cutting acids may be used. In no case, however, is the acidity at the time of cutting less than about 0.33 percent or more than about 0.60 percent equivalent lactic acid. After cutting, the curd and whey begin to separate.

Cooking—The curd is then cooked in the whey with careful stirring by gradually heating the whey to a temperature between about 120° F. and 150° F. Careful attention must be given to the curd and whey at this stage to prevent uneven heating and to prevent overcooking of the curd. Cooking is carried out until a "cooked curd" is provided. This cooked curd has particular characteristics of body and texture which is well recognized by the cheesemaker.

Such characteristics of cottage cheese curd are distinguishable from the physical characteristics of other types of cheese curd which are made by similar or different procedures. For example, it is known to make cheese from whole milk or partially skimmed milk containing more than about one percent by weight of fat by a process substantially similar to cottage cheese make procedures. The curd characteristics of such cheese differ substantially from those of cottage cheese due to the difference in fat content of the starting media.

In general, the cooked curd particles will not coalesce or stick together after cooking of the curd and will readily separate even after application of hand pressure. The characteristics of cooked cottage cheese are well known to the cheesemaker.

Whey separation—The whey is then drained from the curd.

Washing—After the whey is separated from the curd, the curd is subjected to several washings with cool water. After the final washing, the curd is again drained. It is also known to wash the curd with heated water to provide a cottage cheese curd that has improved keeping qualities.

The curd is now in substantially finished form and may be packed in containers for storage and for shipping. It is customary to add a creaming mixture to the curd prior to packaging so as to provide a creamed curd. As indicated above, creamed cottage cheese represents the larger portion of the total consumption of cottage cheese.

The whey and wash water in the production of cottage cheese contain "fines" which are developed in the manufacture. Such fines are generally lost to the cheesemaker. It would be desirable to provide a use for such fines after they are recovered from the whey or from the wash water.

Conventional creaming mixtures for the manufacture of creamed cottage cheese are cultured or uncultured cream or mixtures of cream with milk or skim milk, to which may be added condensed skim milk or skim milk powder. The creaming mixtures may also include a stabilizer, such as a vegetable or marine derived gum, to increase its viscosity. It may also include salt and edible acids for flavor purposes.

In this connection, modern methods and apparatus for packaging creamed cottage cheese in consumer-sized containers require a bulk supply of the creamed cottage cheese to feed the packaging apparatus and the composition of such bulk supply should be uniform throughout a filling cycle. If the creaming mixture does not cling to the curd, but flows downwardly through the interstices between the curd particles, material adjacent the top of the bulk supply will comprise lower levels of the creaming mixture than material adjacent the bottom of the bulky supply. This, of course, results in a non-uniform packaged product.

Increasing the viscosity of the creaming mixture with conventional stabilizers has alleviated the problem of non-conformity to some extent, but it has not provided a completely satisfactory solution under all conditions. Furthermore, governmental regulations may limit the amount and/or type of stabilizer which may be used.

Accordingly, it is a principal object of the present invention to provide an improved creamed cottage cheese and a method for making the same. Another object of the present invention is to provide an improved creaming mixture for cottage cheese and a method for making the same. A further object of the invention is to provide a method for utilizing fines developed in the manufacture of cottage cheese. Other objects and advantages of the present invention will become apparent from the following description and claims.

In accordance with the present invention, there is provided a creaming mixture which includes a stabilizing agent which is compatible with and derived from dairy products, and which provides desirably increased viscosity and adhesion to cottage cheese particles. The stabilizing agent comprises particles of cottage cheese curd. In this connection, the particles of cottage cheese curd which are used as the stabilizing agent in the invention may be obtained from any substantially solid particles formed in the manufacture of cottage cheese. In particular, the particles of cottage cheese curd may comprise cottage cheese curd which has been ground, comminuted or otherwise reduced in particle size, or fines produced in the manufacture of cottage cheese. Preferably, the cottage cheese curd or fines are of a reduced particle size so that they may be uniformly suspended in one or more of the fluid milk products used in preparing the creaming mixture.

In general, it is desirable that the particle size of the cottage cheese curd or fines be of such reduced size that there is no grainy mouth feel encountered in the creaming mixture into which the comminuted cheese curd and/or fines are distributed.

In the present invention cottage cheese curd refers to the uncured coagulum produced when skim milk is set by an acid make procedure. That is, the acidity of the skim milk is increased until a coagulum is formed by precipitation of the protein in the skim milk.

The skim milk may be derived by removing the fat from whole malk or may be prepared by reconstituting non-fat milk solids to substantially the level of solids found in skim milk, or sometimes to slightly higher levels, i.e., from about 8.0 to about 14.0 percent by weight. The fat content of the skim milk is usually less than about 1.0 percent by weight and is preferably less than about 0.2 percent by weight. At fat levels above about 1.0 percent in the skim milk the fat level of the curd is increased to a point where the curd becomes too soft and gummy for use as a stabilizing agent in the invention. Rennet may be used in the make procedure, but is usually not present at a level above about one cubic centimeter of commercial single strength rennet per 1000 lbs. of milk.

Cottage cheese curd fines which are recovered from either the whey or the wash water of a cottage cheese make procedure as described above may also be used as the stabilizing agent in the practice of the invention. The particle size of such fines is generally too large to permit their effective use by merely blending with the creaming mixture. It is preferable to further reduce the particle size of the fines by a suitable method, such as by blending the fines with the creaming mixture and thereafter homogenizing the resultant blend.

In this connection, it is an important feature of the invention that the comminuted material, whether obtained from whole curd or curd fines, be thoroughly blended with at least a portion of the creaming mixture prior to combining that portion with cottage cheese curd to prepare creamed cottage cheese. This is, the mere presence of comminuted cottage cheese curd or curd fines in the finished cream cottage cheese is not enough to obtain the benefits of the invention.

The stabilizing agent of the invention is used at levels of from about 5 percent to about 60 percent by weight of the creaming mixture. At levels below about 5 percent no substantial amount of stabilization is observed. The level of stabilizing agent which may be provided in the creaming mixture without causing undesirably high viscosity is dependent on the level of fat in the creaming mixture. For example, creamed cottage cheese compris-ing fat in excess of about 4 percent cannot have creaming mixture having more than about 30 percent stabilizing agent based upon the weight of the creaming mixture without becoming too viscous. Higher levels of comminuted cottage cheese curd within the indicated range may be used in creaming mixtures containing less fat. Since cottage cheese curd usually comprises from about 15 percent to about 25 percent by weight of solids, the total cottage cheese curd solids which are present in the creaming mixture will be from about 1 percent to about 15 percent by weight of the creaming mixture.

The creaming mixture of the present invention has distinct advantages over creaming mixtures heretofore known. A particular advantage resides in the fact that the stabilizing agent utilized in the creaming mixture is of substantially the same composition, and is derived from the same food material as the cottage cheese curd to which it is added. Accordingly, it is compatible with, and therefore essentially equivalent to the cottage cheese curd, and may therefore be utilized at whatever levels are necessary to provide the desired result. Furthermore, the moisture content of the stabilizing agent is substantially the same as the moisture content of the desired finished creamed cottage cheese. Since the stabilizing agent is not derived from vegetable or marine material, but is derived from cottage cheese manufacture, its use is not subjected to the same governmental regulation as in the case of stabilizers heretofore known. In addition, there is provided a stabilized creaming mixture essentially comprising fluid milk products and milk-derived solids. (Minor amounts of salt and/or edible organic acids may also be present.)

The following examples further illustrate various features of the invention but are intended to in no way limit the scope of the invention which is defined in the appended claims.

EXAMPLE I

As a specific example of the present invention, a vat of skim milk having 9.0 percent solids and 0.2 percent fat was made into large curd cottage cheese in accordance with a conventional make procedure. This procedure included addition of starter to the milk, addition of rennet at a level of one cc. of commercial single strength rennet to the milk, and culturing the milk to an acidity of 0.50 percent equivalent lactic acid until the milk had set to form a coagulum. The resultant coagulum was then cut, cooked and drained, following which it was washed with two successive cold water washes and again allowed to drain.

The resultant cottage cheese curd was thereafter creamed with a dressing comprising about 11.5 percent milk fat, about 10 percent milk solids not fat and about 2.7 percent salt.

After the dressing had been uniformly distributed throughout the curd, approximately 18 percent by weight of the blend was separated from the remaining material and was homogenized by conducting it through a single stage homogenizer at a pressure of 1,000 p.s.i. The resultant homogenized creaming mixture was then added back to the remaining blend of cottage cheese curd and dressing, and was uniformly distributed therethrough.

The resultant creamed cottage cheese was packaged in conventional packaging apparatus, in which the creamed cottage cheese was metered and dispensed into containers. The viscosity of the creaming mixture was sufficient to provide uniformity of composition in the containers throughout the packaging cycle.

About three weeks after packaging, the containers were opened and evaluated for storage stability. The creamed cottage cheese was still satisfactory, with no change in body or consistency of the curd or of the creaming mixture.

EXAMPLE II

As a further example of the practice of the present invention, a creaming mixture in accordance with the present invention was prepared which comprised substantially no fat, but which nevertheless provided the benefits of the present invention. The creaming mixture was prepared by blending 60 pounds of previously-prepared cottage cheese curd (20 percent solids) with 20 pounds of condensed skim milk (30 percent solids) and 20 pounds of a cultured buttermilk. The curd particles in the resultant blend were thereafter reduced in size by pumping the blend through a commercially-available apparatus comprising a network of stainless steel wires in close proximity to each other disposed rigidly within a sanitary pipeline. Passage of the blend through the interstices between the wires resulted in substantial reduction of particle size of the curd, and a creaming mixture with 12 percent cottage cheese solids and having a smooth and unbroken texture was thereby obtained.

The resultant creaming mixture, comprising substantially no fat, was then utilized by combining it with 200 pounds of previously prepared cottage cheese curd. The resultant cottage cheese was packaged and stored for two weeks at 40° F. At the end of that time, it was examined and found to have good body and flavor.

EXAMPLE III

As a further example of the practice of the present invention, a series of samples of creamed cottage cheese utilizing the creaming mixture in accordance with the present invention was prepared, utilizing various proportions of cottage cheese curd to creaming mixture. In this connection, creaming mixtures were prepared comprising the following levels of cottage cheese curd (about 20 percent solids):

Creaming mixture: Percent
- No. 1 ---------------------------------------- 11
- No. 2 ---------------------------------------- 19
- No. 3 ---------------------------------------- 24
- No. 4 ---------------------------------------- 29
- No. 5 ---------------------------------------- 32

Each of the foregoing creaming mixtures was prepared by blending the cottage cheese curd with a dairy fluid comprising 12 percent butterfat, 10 percent MSNF, 3.0 percent salt, and 0.15 percent citric acid, and homogenizing the mixture at 1,000 p.s. i.

Each of the foregoing creaming mixtures was thereafter used in preparing samples of creamed cottage cheese by blending cottage cheese curd with a sufficient amount of respective creaming mixture to provide 4 percent by weight of butterfat in the creamed cottage cheese. All samples of the resultant creamed cottage cheese were packaged, and were evaluated after 24 hours storage at 40° F. There was no wheying off in any of the samples, and all were considered to be desirable products, with the exception of the creamed cottage cheese comprising creaming mixture No. 5. The viscosity of the latter creaming mixture was considered too high for use in preparing creamed cottage cheese containing 4 percent fat.

EXAMPLE IV

A creaming mixture in accordance with the present invention was prepared which contained cottage cheese curd fines which had been recovered from the wash water used in the preparation of the cottage cheese. The moisture level of the fines was adjusted to 80 percent by weight by centrifugal extraction of the fines.

The fines were combined with a dressing comprising 30 percent cream (containing 40 percent butterfat), 64 percent skim milk (containing 8.8 percent non-fat solids), 3.0 percent dry non-fat milk solids and about 3.0 percent salt. The fines were added to the creaming mixture to provide a level of 19 percent fines by weight of the creaming mixture.

After adding the fines to the creaming mixture the resultant mix was thoroughly blended by conducting it through a single stage homogenizer at a pressure of 1,000 p.s.i. The resultant creaming mixture was then added to cottage cheese curd and was uniformly distributed therethrough.

The resultant creamed cottage cheese was packaged with conventional packaging apparatus, in which the creamed cottage cheese was metered and dispensed into containers. The viscosity of the creaming mixture was sufficient to provide cottage cheese of uniform composition in the containers throughout the packaging cycle.

After three weeks of storage, the containers were opened and evaluated for storage stability. The creamed cottage cheese was still satisfactory with no change in body or consistency of the curd or of the creaming mixture.

EXAMPLE V

Creamed cottage cheese was prepared in accordance with the method of Example IV with the exception that the cottage cheese fines were recovered from the whey obtained from a cottage cheese make procedure. The resultant creamed cottage cheese was packaged and stored in containers. After three weeks of storage, the containers were opened and evaluated for storage stability. The creamed cottage cheese was still satisfactory with no change in body or consistency of the curd or of the creaming mixture.

Thus, there has been provided an improved creamed cottage cheese, and an improved creaming mixture therefor. The level of comminuted cottage cheese curd and/or fines utilized in the creaming mixture, and the proportion of the creaming mixture in the creamed cottage cheese, may be varied by the person skilled in the art to obtain a desired viscosity and/or solids content and to thereby provide the desired result.

Various modifications of the creaming mixture of the present invention will be apparent to those skilled in the art from the preceding description and the appended claims, which modifications are considered to be within the scope thereof.

What is claimed is:

1. A method for preparing an improved creaming mixture for cottage cheese, comprising providing comminuted cottage cheese curd and a cottage cheese creaming mixture, and blending said comminuted cottage cheese curd and said cottage cheese creaming mixture so as to provide a creaming mixture for cottage cheese containing suspended comminuted cottage cheese curd, said comminuted cottage cheese curd being present at a level of from about 5 percent to about 60 percent by weight of said creaming mixture.

2. A method in accordance with claim 1 wherein said comminuted cottage cheese curd is obtained from whole cottage cheese curd.

3. A method in accordance with claim 1 wherein said comminuted cottage cheese curd is obtained from cottage cheese curd fines.

4. An improved stabilized creaming mixture for cottage cheese comprising, in combination, a blend of a cottage cheese creaming mixture and as a stabilizer, comminuted cottage cheese curd, said comminuted cottage cheese curd being present at a level of from about 5 percent to about 60 percent by weight of said improved creaming mixture and said comminuted cottage cheese curd being of a reduced particle size such that said curd remains uniformly suspended in said cottage cheese creaming mixture.

5. An improved creaming mixture for cottage cheese in accordance with claim 4, wherein said comminuted cottage cheese curd is obtained from whole cottage cheese curd.

6. An improved creaming mixture for cottage cheese in accordance with claim 4 wherein said comminuted cottage cheese curd is obtained from cottage cheese curd fines.

7. A method for the manufacture of an improved creamed cottage cheese, comprising providing comminuted cottage cheese curd and a cottage cheese creaming mixture, blending said comminuted cottage cheese curd and said cottage cheese creaming mixture so as to provide a creaming mixture for cottage cheese containing suspended comminuted cottage cheese curd, said comminuted cottage cheese curd being present at a level of from about 5 percent to about 60 percent by weight of said creaming mixture, preparing cottage cheese curd, and adding said creaming mixture to said cottage cheese curd.

8. A method in accordance with claim 7 wherein said comminuted cottage cheese curd in said creaming mixture is obtained from whole curd.

9. A method in accordance with claim 7 wherein said comminuted cottage cheese curd in said creaming mixture is obtained from cottage cheese curd fines.

10. A method for the manufacture of an improved cottage cheese creaming mixture comprising providing a cottage cheese curd source selected from whole cottage cheese curd or cottage cheese curd fines, providing a cottage cheese creaming mixture, adding said cottage cheese curd source to said cottage cheese creaming mixture to form a blend and treating said blend so as to comminute said cottage cheese curd source and to provide a creaming mixture for cottage cheese which contains suspended comminuted cottage cheese curd, said cottage cheese curd source being present in said blend at a level of about 5 percent to about 60 percent by weight.

11. A method in accordance with claim 10 wherein said comminution is effected by homogenizing said blend of a cottage cheese creaming mixture and a cottage curd source.

References Cited

UNITED STATES PATENTS

| 2,160,159 | 5/1939 | Lundstedt et al. | 99—117 |
| 2,971,847 | 2/1961 | Babel et al. | 99—116 |
| 3,323,921 | 6/1967 | Moseley et al. | 99—117 X |

OTHER REFERENCES

Olson et al.: Effects of Gelatin Level and Homogenization on the Viscosity and Thixotropic Properties of Dressing for Cottage Cheese, J. Da. Sci., 1962, vol. 45 (p. 647).

Guthrie: Effect of Stabilizer on Body of Cultured Cream, J. Da. Sci., 1962, vol. 45 (p. 647).

A. LOUIS MONACELL, Primary Examiner

D. M. NAFF, Assistant Examiner

U.S. Cl. X.R.

99—117